United States Patent Office 3,431,756
Patented Mar. 11, 1969

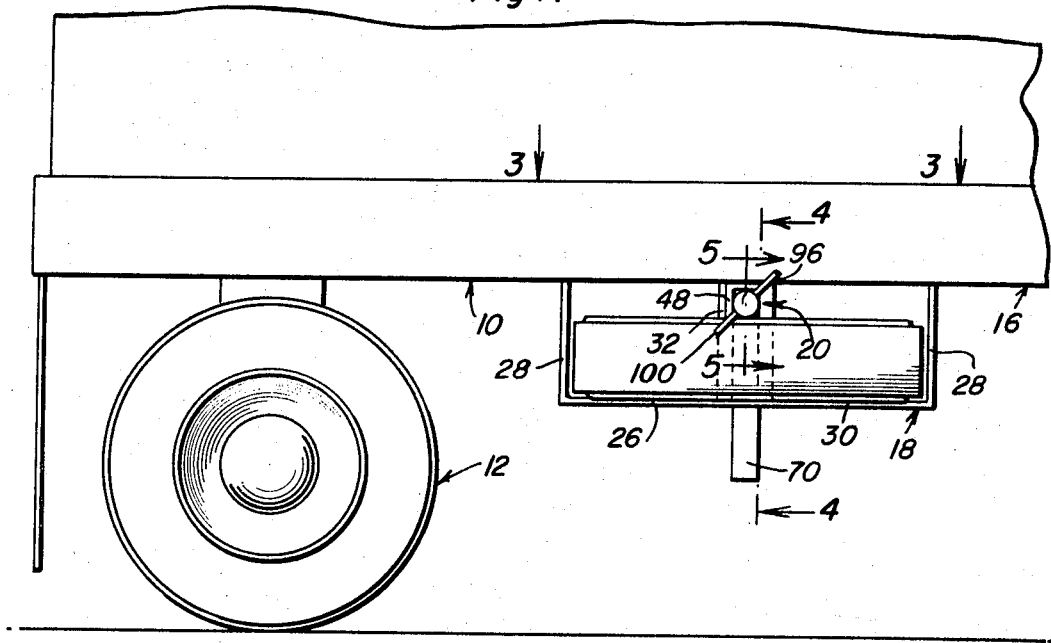
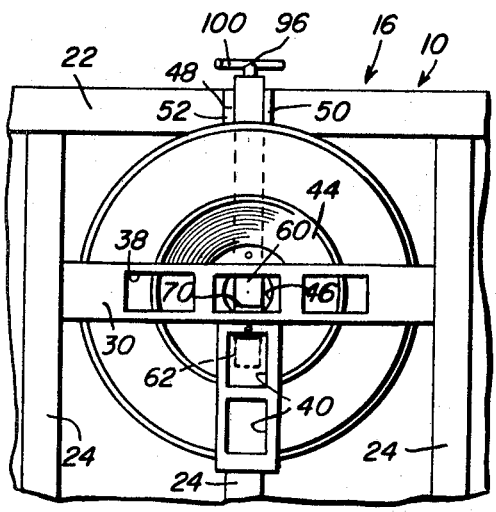
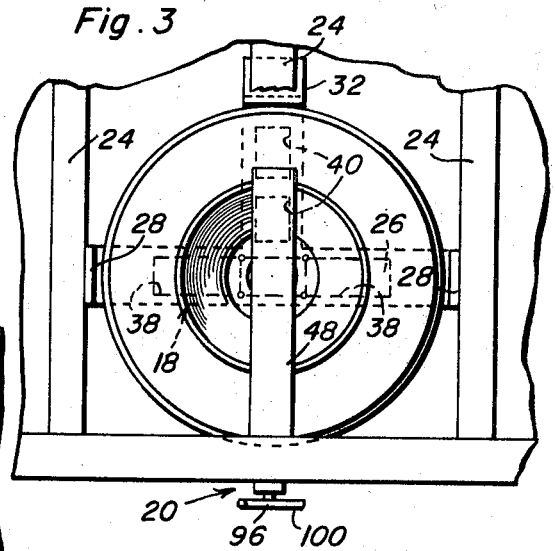
Louis V. Fennell
INVENTOR.

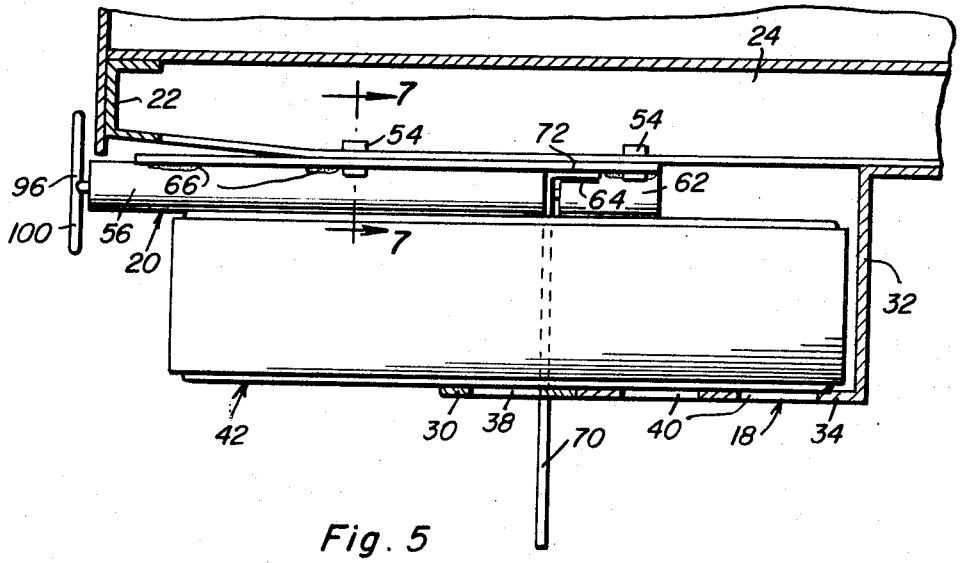
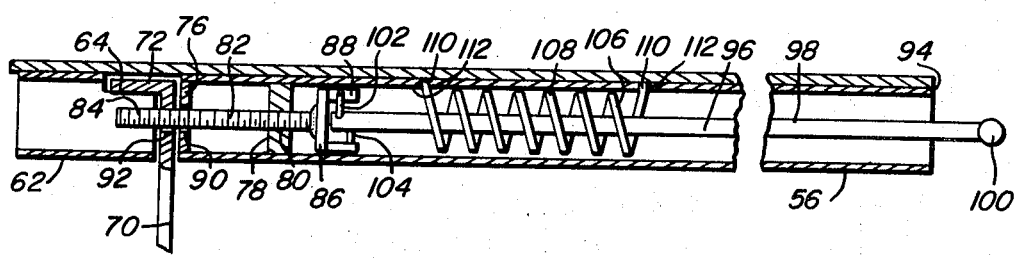
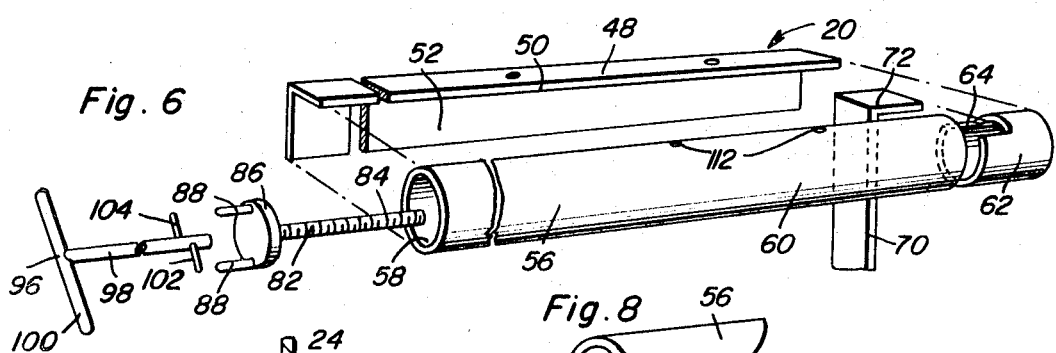
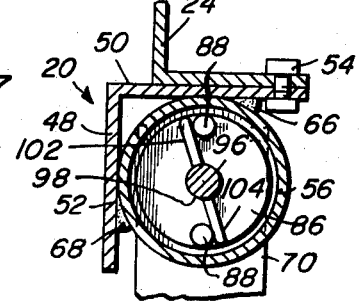
Louis V. Fennell
INVENTOR.

3,431,756
TRUCK SPARE TIRE LOCK
Louis V. Fennell, 141 Carter Lake Club,
Carter Lake, Iowa
Filed Nov. 21, 1966, Ser. No. 595,818
U.S. Cl. 70—259          11 Claims
Int. Cl. E05b 65/12, 19/00; B62d 43/00

ABSTRACT OF THE DISCLOSURE

A locking mechanism including an elongated passage defining member open at one end and including a locking member disposed at the other end portion shiftable laterally of the passage between locked and unlocked positions. A latch member is disposed and enclosed within the passage for guided movement therealong between a locked position operatively associated with the locking member to prevent its movement from its locked position toward its unlocked position and an unlocked position allowing movement of the locking member to its unlocked position and a long neck key is provided and insertable into the open end of the passage and engageable with the latch member for shifting the latter between its locked and unlocked position.

---

This invention relates to a novel and useful spare tire or wheel lock for trucks and more specifically to a lock designed to greatly reduce the number of thefts of spare tires or wheels from underslung truck wheel or tire racks of the type defining a generally horizontally opening support structure in which a spare tire or wheel is receivable and from which the spare tire or wheel may be removed upon horizontal displacement of the spare tire or wheel outwardly of the opening in the wheel supporting structure.

The truck spare tire lock of the instant invention is designed primarily for use on a basket-type wheel carrier utilized on large semitrailers and the like. This common type of carrier used by many long haul truck operators has its advantages in that the wheel or tire supported therefrom is accessible and can be removed and replaced in the carrier by one man. Further, such a basket-type carrier occupies otherwise unused space. The main disadvantage to this type of wheel carrier is that the tire or wheel supported therefrom is open to casual pilferage.

The most common attempt to prevent such pilferage has been the use of a chain and padlock in a manner tethering the tire or wheel to the carrier. While this prevents pilferage of a tire or wheel by a thief not having tools, such attempt at preventing tire or wheel pilferage is easily negated by the use of a simple hand tool such as a bolt cutter or the like which can be used to quickly cut through a chain. Further, such chains and locks are fully exposed to the roadway and are therefore intermittently subjected to water spray and eventually become ineffective due to deterioration from rust.

The lock of the instant invention includes an elongated lock member adapted for lengthwise insertion through the center opening of a spare tire or wheel and a similar opening in the basket-type carrier from which the spare wheel is supported and which is aligned with the center opening in the spare wheel. The lock or locking member is positioned in relation to the openings through which it extends in a manner such that the associated spare wheel may not be radially shifted for removal from the basket-type carrier and the lock includes means for stationary attachment to the associated vehicle for releasably securing the lock or locking member in its locked position against longitudinal withdrawal through the aforementioned openings.

The main object of this invention is to provide a spare truck tire or wheel lock for use in conjunction with a basket-type spare tire or wheel carrier conventionally utilized on trucks and trailers.

Another object of this invention, in accordance with the immediately preceding object, and in a manner such that the latching portion of the lock is substantially fully enclosed and thus hidden so as to be inaccessible to persons who might wish to remove the associated spare tire or wheel in an unauthorized manner by breaking the lock or latching portion thereof.

Still another object of this invention is to provide a truck spare tire or wheel lock including key means therefor of simple but precise design and operable to pass through a tortuous passage providing access to the latch portion of the lock and to engage the latch portion of the lock in a manner to in effect unlock the lock with a minimum amount of effort.

A final object of this invention to be specifically enumerated herein is to provide a truck spare tire or wheel lock in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the rear portion of a semitrailer vehicle including a basket-type spare tire or wheel rack and having the lock of the instant invention operatively associated with the spare tire rack and the spare tire supported therefrom;

FIGURE 2 is a fragmentary bottom plan view of the spare tire rack;

FIGURE 3 is a fragmentary horizontal sectional view taken substantially upon the plane indicated by the section line 3—3 of FIGURE 1;

FIGURE 4 is an enlarged fragmentary transverse vertical sectional view taken substantially upon the plane indicated by the section line 4—4 of FIGURE 1;

FIGURE 5 is a fragmentary enlarged transverse vertical sectional view taken substantially upon the plane indicated by the section line 5—5 of FIGURE 1;

FIGURE 6 is a fragmentary exploded perspective view of the spare tire lock with portions thereof being broken away and illustrated in section;

FIGURE 7 is an enlarged fragmentary longitudinal vertical sectional view taken substantially upon a plane indicated by the section line 7—7 of FIGURE 4;

FIGURE 8 is a fragmentary perspective view of one end of the spare tire lock illustrating a modified form of construction.

Referring now more specifically to the drawings the numeral 10 generally designates a semitrailer including a rear axle assembly generally referred to by the reference numeral 12 supported from the main frame portion 16 of the semitrailer 10. Of course, the semitrailer 10 is adapted, at its front end, to be operatively connected to a tractor.

The trailer 10 is provided with an underslung basket-type spare tire or wheel rack generally referred to by the reference numeral 18 and the lock of the instant invention which is operatively associated with the rack 18, is generally referred to by the reference numeral 20.

The frame 16 of the semitrailer 10 includes a pair of opposite side longitudinal members 22 interconnected by means of suitable transverse frame members 24. The rack 18 includes a U-shaped frame 26 including a pair of depending legs 28 interconnected at their lower ends by means of an integral horizontal bight portion 30 and the upper ends of the legs 28 are secured to a pair of the transverse brace members 24 in any convenient manner. Further, the frame 26 includes an inner depending leg 32 whose upper end is secured to a third transverse brace member 24 and whose lower end includes a laterally directed portion 34 formed integrally with or suitably fixedly secured to the bight portion 30 centrally intermediate its opposite ends. In this manner, the rack 18 is closed at its front and rear ends by the legs 28 and at its inner side by the leg 32. Therefore, the frame 26 defines a horizontally outwardly opening basket-type rack in which a spare wheel or spare tire may be readily horizontally inserted from the adjacent side of the semitrailer 10.

The bight portion 30 is conventionally provided with a plurality of longitudinally spaced openings 38 and the laterally directed lower end portion 34 of the leg 32 may also be provided with suitable longitudinally spaced openings 40.

Conventionally, a spare tire such as that generally designated by the reference numeral 42 mounted on a wheel rim 44 would be horizontally inserted into the rack 18 from the open side thereof and be secured therein by means of a length of chain passed through the center opening 46 of the wheel 44 and also an appropriate opening 38 in the bight portion 30. Then, the free ends of the chain could be secured together in any convenient manner such as by a padlock and therefore removal of the spare tire 42 would be prevented by the chain and padlock. Of course, as previously hereinbefore set forth, a person wishing to remove the spare tire 42 without proper authority could readily do so by utilizing a conventional bolt cutter to cut the chain.

The spare tire lock 20 of the instant invention has been specifically designed to prevent unauthorized removal of the spare tire 42 from the rack 18 even though an unauthorized person may be provided with various types of hand tools to assist him in removing the tire 42.

The lock 20 of the instant invention includes an elongated supporting member 48 defining an angle member including a horizontal flange 50 and a vertical flange 52. The horizontal flange 50 is secured to and extends longitudinally along the transverse base member 24 to which the upper end of the leg 32 is secured. Suitable fasteners 54 may be utilized in securing the horizontal flange portion 50 to the corresponding transverse member 24 and other means, such as welding, may be utilized if desired.

The spare tire lock 20 also includes an elongated tubular guide member 56 open at one end as at 58. The guide member 56 includes a first section 60 and a second section 62. The second section 62 is slightly axially spaced from the corresponding end of the section 60 and includes a notched upper portion defining an upwardly facing seat 64.

The sections 60 and 62 are each secured to the horizontal and vertical flanges 50 and 52 of the support member 48 by means of welding 66 and 68. The axial spacing between the second section 62 and the first section 60 and the upwardly facing seat 64 define an inverted L-shaped seat for receiving the upper end of a strong locking bar 70, the upper end of the bar 70 terminating in a laterally directed flange 72 and therefore being generally inverted L-shaped in configuration. The seat 64 obviously closely underlies the horizontal flange 50 and therefore the upper end of the locking bar 70 may have its flange 72 engaged with the seat 60 for only upon lateral advancement of the locking bar 70 into the seat 64. Inasmuch as the horizontal flange 50 overlies seat 64, the locking bar 70 is limited in its upward movement as well as its downward movement. Of course, it may be seen that the lower end portion of the locking bar 70 passes through one of the openings 38 and also the center opening 46 in the vehicle wheel 44 and thereby prevents outward movement of the spare tire 42 relative to the rack 18. The end of the first section 60 adjacent the section 62 has an apertured end plate 76 secured therein and also a partition 78 having a threaded bore 80 formed therethrough, the partition 78 being spaced slightly inwardly of the end plate 76.

A latch member in the form of a screw shaft 82 is provided and one end of the shaft 82 is devoid of threads as at 84. In addition, the other end of the shaft 82 is provided with a disk-shaped head 86 and the head 86 includes axial projections 88. The screw shaft 82 is threadedly engaged with the partition 78 and the end 84 thereof is receivable through the aperture 90 formed in the end plate 76. Further, the locking bar 70 is provided with an aperture 92 adjacent the laterally directed flange 72 and the end 84 of the screw shaft 82 is also receivable through the aperture 92, the latter being horizontally registered with the aperture 90 formed in the end plate 76 when the locking bar 70 has its laterally directed flange 72 seated in the seat 64. Accordingly, upon rotation of the screw shaft 82 about its longitudinal axis through the threaded bore 80, the end 84 of the screw shaft 82 may be caused to pass through the apertures 90 and 92 and thereby positively lock the locking bar 70 to the guide member 56.

From FIGURE 5 of the drawings it may be seen that the disk-shaped head 86 on the screw shaft 82 is spaced appreciably from the open end 94 of the guide member 56 when the screw shaft 82 has its end portion 84 passed through the apertures 90 and 92. Therefore, an elongated key 96 is provided. The key 96 includes a long shank portion 98 having a handle 100 on one end and a pair of axially spaced and radially extending pins 102 and 104 on its other end. The key 96 may have its shank portion 98 inserted into the open end of the guide member 56 in a manner operable to engage the pins 102 and 104 with the projections 88 thereby enabling the shank portion 98 to be rotated by means of the handle 100 in order to unscrew the screw shaft 82 outwardly of the bore 80 toward the open end of the guide member 56. Of course, movement of the screw shaft 82 toward the open end of the guide member 56 will withdraw the end portion 84 from the apertures 90 and 92 and thereby enable the upper end of the locking bar 70 to be swung laterally displaced outwardly of the seat 64 and thereafter to be dropped downwardly through the center opening 46 in the wheel 44 and also the center opening 38 in the frame 26.

In order to prevent a person from readily making a key which could be utilized to rotate the screw 82, the first section 60 has a coil spring 106 secured therein whose convolutions 108 are spaced apart. The coil spring 108 includes laterally outwardly directed free end portions 110 suitably anchored in radial bores 112 provided therefor in the first section 60 and the spacing between the convolutions 108 and the axial spacing between the pins 102 and 104 coact to enable the pins 102 and 104 to be threaded through the convoluted path defined by the coil spring 106. Of course, after the pins 102 and 104 have been threaded through the convoluted path, the key 96 may be further inwardly axially displaced until the pins 102 and 104 are operatively engaged with the projections 88.

With attention now invited to FIGURE 8 of the drawings there may be seen an end plate 116 secured in the open end of the first section 60. The end plate 116 has a keyhole opening 118 formed therein and the end plate 116 is rigidly secured in the open end of the first section 60. In order to insert the key 96 into the first section 60, the free end of the shank portion 98 is first engaged with the circular portion 120 of the keyhole opening 118. Then, the shank portion 98 may be rotated to bring the pin 102 into registry with the elongated portion 122 of the keyhole opening 118 whereupon the pin 102 may be passed into the first section 60. Then, the shank portion 98 is further rotated until the pin 104 passes through the elongated portion 122. Thereafter, the key 96 may be freely axially inwardly displaced and rotated so as to pass the pins 102 and 104 through the convoluted path defined by the coil spring 106 before engagement of the pins 102 and 104 with the projections 88.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

We claim:

1. In combination with a spare wheel rack of the type defining a support structure, a spare wheel supported from said support structure and radially shiftable for removal from said support structure, said support structure and said spare wheel including means defining aligned openings extending therethrough and axially of said wheel, an elongated lock member extending through said openings and locking said spare wheel to said support structure against displacement relatively to said support structure and removal therefrom, and latch means stationarily supported relative to said support structure and including a movable latch member shiftable between a first position operatively associated with said lock member to prevent its longitudinal displacement through said openings and a second position out of operative association with said lock member allowing said lock member to be withdrawn at least through the opening in said wheel, said latch member being movable transversely of said lock member along a generally straight path between said first and second positions, an elongated guide member defining a passage at least substantially closed on all sides and open at one end, at least a portion of said path being defined by a portion of the other end of said passage, and a long neck key insertable into the open end of said passage and engageable with said latch member for shifting the latter between said first and second positions.

2. In combination with a spare wheel rack of the type defining a generally horizontally opening support structure, generally horizontally disposed spare wheel supported from said support structure and removable horizontally from said support structure through the open portion thereof, said support structure and said spare wheel including means defining aligned upstanding openings extending therethrough, an elongated lock member extending through said openings and locking said spare wheel to said support structure against horizontal displacement outwardly through the open portion of said support structure, and latch means stationarily supported relative to said support structure and including a movable latch member shiftable between a first position operatively associated with said lock member to prevent its longitudinal displacement through said openings and a second position out of operative association with said lock member allowing said lock member to be withdrawn at least through the opening in said wheel, said latch member being movable transversely of said lock member along a generally straight path between said first and second positions, an elongated guide member defining a passage at least substantially closed on all sides and open at one end, at least a portion of said path being defined by a portion of the other end of said passage, and a long neck key insertable into the open end of said passage and engageable with said latch member for shifting the latter between said first and second positions.

3. The combination of claim 2 wherein said latch member includes a screw shaft portion extending longitudinally of said path and threadedly engaged with a portion of said guide member disposed in said other end of said passage and along said path, said key and said latch member including first and second coacting portions, respectively, removably engageable with each other upon insertion of one end of said neck into said passage operative to couple said key to said latch member for rotation of the latter in response to rotation of said key about the longitudinal axis of said neck of said key.

4. The combination of claim 3 wherein said passage, intermediate the open end thereof and said other end thereof includes means defining a tortuous portion, the first portion of said coacting portions carried by said key being passable through said tortuous portion only upon angular adjustment of said key about its longitudinal axis.

5. The combination of claim 4 wherein said first portion includes at least one generally radially outwardly extending projection carried by said neck.

6. The combination of claim 5 wherein the second portion of said coating portions includes a generally axially extending projection carried by the end of said latch member adjacent and projecting toward the open end of said passage, said tortuous portion being defined by a convoluted section of said passage through which said radially outwardly extending projection is threadable upon simultaneous axial displacement and rotation of said key about its longitudinal axis.

7. The combination of claim 6 wherein said first portion includes a pair of projections generally paralleling different radii of the longitudinal center axis of said key and spaced axially therealong, said pair of projections being simultaneously threadable through said convoluted section.

8. The combination of claim 4 wherein said first portion includes at least one generally radially outwardly extending projection carried by said neck, the second portion of said coacting portions includes a generally axially extending projection carried by the end of said latch member adjacent and projecting toward the open end of said passage, said tortuous portion being defined by a convoluted section of said passage through which said radially outwardly extending projection is threadable upon simultaneous axial displacement and rotation of said key about its longitudinal axis, said convoluted section being defined by a coil spring whose adjacent convolutions are at least slightly spaced apart.

9. A locking mechanism comprising an elongated passage defining member open at one end and adapted to be mounted from a supporting structure in fixed position thereon, a locking member disposed at the other end portion of said passage defining member and shiftable laterally thereof between locked and unlocked positions, a latch member disposed in one end of said passage defining member and mounted for guided movement therealong between a locked position operatively associated with said locking member to prevent its movement from its locked position toward its unlocked position and an unlocked position allowing movement of said locking member to its unlocked position, and a long neck key insertable into the open end of said passage and engageable with said latch member for shifting the latter between its locked and unlocked position, said latch member being substantially entirely enclosed within said passage defining member for access thereto only from the open end of said passage, said latch member including a screw shaft portion extending longitudinally of said path and threadedly engaged with a portion of said passage defining member disposed in said other end of said passage, said key and said latch member including first and second coacting portions, respectively, removably engageable with each other upon insertion of one end of said neck into said passage operative to couple said key to said latch member for rotation of the latter in response to rotation of said key about the longitudinal axis of said neck of said key.

10. The combination of claim 9 wherein said passage, intermediate the open end thereof and said other end thereof includes means defining a tortuous portion, the first portion of said coacting portions carried by said key being passable through said tortuous portion only upon angular adjustment of said key about its longitudinal axis.

11. The combination of claim 10 wherein said first portion includes at least one generally radially outwardly extending projection carried by said neck.

(References on following page)

References Cited

UNITED STATES PATENTS

| | | | |
|---|---|---|---|
| 1,610,722 | 12/1926 | Sheetz | 224—42 |
| 1,124,862 | 1/1915 | Clemmer et al. | 70—393 |
| 1,175,946 | 3/1916 | Foster | 70—393 |
| 1,373,392 | 3/1921 | Ridgely | 224—42 |
| 1,453,913 | 5/1923 | Burdick | 70—393 |
| 1,526,728 | 2/1925 | Wagner | 70—412 |
| 1,813,094 | 7/1931 | Appel | 214—451 |
| 2,399,207 | 4/1946 | Clark | 214—453 |
| 3,081,924 | 3/1963 | Herbler et al. | 224—42 |

MARVIN A. CHAMPION, *Primary Examiner.*

R. L. WOLFE, *Assistant Examiner.*

U.S. Cl. X.R.

224—42.25; 70—393